United States Patent
Patsilaras et al.

(10) Patent No.: US 12,182,036 B2
(45) Date of Patent: Dec. 31, 2024

(54) PROVIDING CONTENT-AWARE CACHE REPLACEMENT AND INSERTION POLICIES IN PROCESSOR-BASED DEVICES

(71) Applicant: QUALCOMM Incorporated, San Diego, CA (US)

(72) Inventors: George Patsilaras, San Diego, CA (US); Engin Ipek, San Diego, CA (US); Goran Goran, Springfield, PA (US); Hamza Omar, San Diego, CA (US); Bohuslav Rychlik, San Diego, CA (US); Jeffrey Gemar, San Diego, CA (US); Matthew Severson, Austin, TX (US); Andrew Edmund Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/163,446

(22) Filed: Feb. 2, 2023

(65) Prior Publication Data

US 2024/0264950 A1    Aug. 8, 2024

(51) Int. Cl.
*G06F 12/126* (2016.01)
*G06F 12/0888* (2016.01)

(52) U.S. Cl.
CPC ........ *G06F 12/126* (2013.01); *G06F 12/0888* (2013.01); *G06F 2212/502* (2013.01)

(58) Field of Classification Search
CPC combination set(s) only.
See application file for complete search history.

(56) References Cited

U.S. PATENT DOCUMENTS 11,636,215 B2    4/2023  Kumar et al.
2008/0147983 A1*  6/2008  Thomas ............... G06F 12/121
                                                  711/134
(Continued)

FOREIGN PATENT DOCUMENTS

TW         201011775 A       3/2010
WO    WO-2019128958 A1 *    7/2019  ............. G06F 12/12

OTHER PUBLICATIONS

Dally, B., "The Future of Computing: Domain-Specific Accelerators," Keynote Address, MICRO 2019: 52nd IEEE/ACM International Symposium on Microarchitecture, Oct. 12-16, 2019, Columbus, Ohio, USA, 68 pages.

(Continued)

*Primary Examiner* — Michael Krofcheck
(74) *Attorney, Agent, or Firm* — W&T/Qualcomm

(57) ABSTRACT

Providing content-aware cache replacement and insertion policies in processor-based devices is disclosed. In some aspects, a processor-based device comprises a cache memory device and a cache controller circuit of the cache memory device. The cache controller circuit is configured to determine a plurality of content costs for each of a plurality of cached data values in the cache memory device, based on a plurality of bit values of each of the plurality of cached data values. The cache controller circuit is configured to identify, based on the plurality of content costs, a cached data value of the plurality of cached data values associated with a lowest content cost as a target cached data value. The cache controller circuit is also configured to evict the target cached data value from the cache memory device.

14 Claims, 9 Drawing Sheets

(56) References Cited

U.S. PATENT DOCUMENTS

2010/0030963 A1* 2/2010 Marcu ................... G06F 12/126
  711/E12.017
2014/0292782 A1* 10/2014 Fishwick ................. G06T 1/20
  345/522
2017/0041428 A1* 2/2017 Katsev ................... H04L 67/02
2021/0109861 A1* 4/2021 Yin ..................... G06F 12/0855
2022/0292015 A1* 9/2022 Klimov ................... G06F 21/64

OTHER PUBLICATIONS

International Search Report and Written Opinion for International Patent Application No. PCT/US2023/084172, mailed Apr. 3, 2024, 12 pages.

* cited by examiner

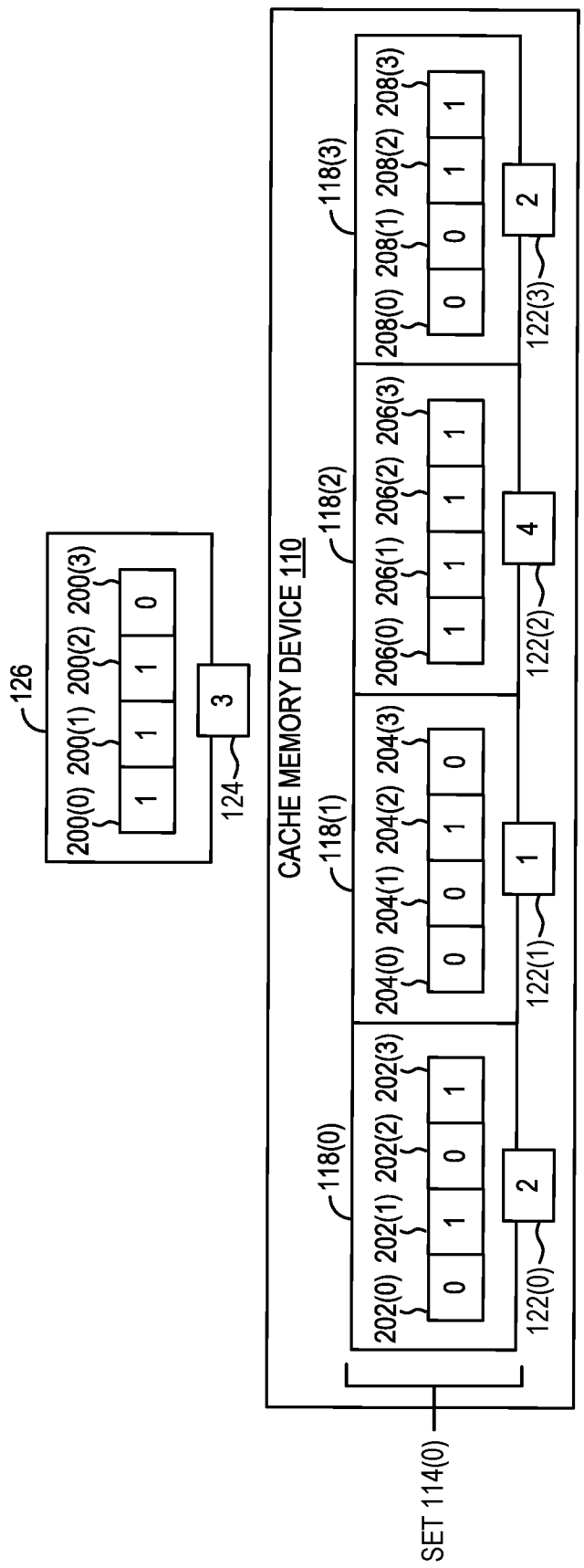
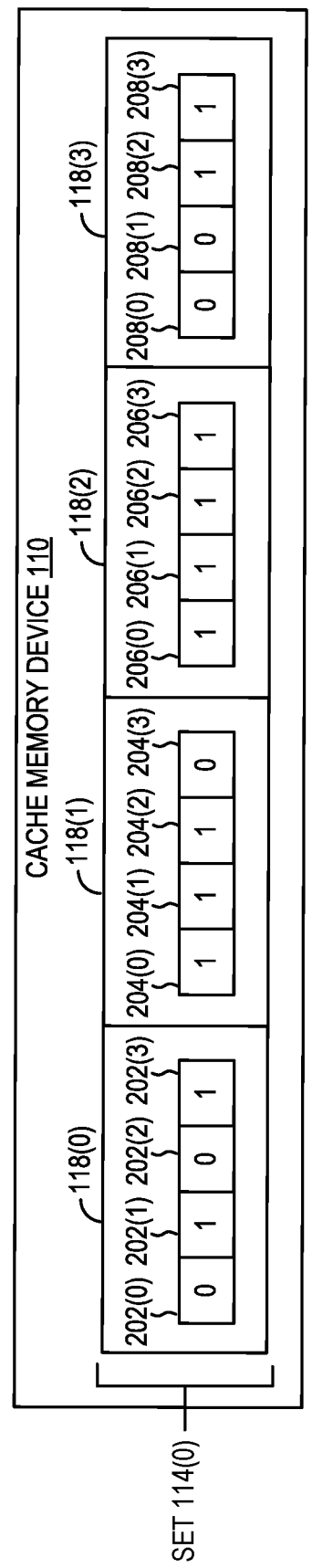
FIG. 2A
FIG. 2B

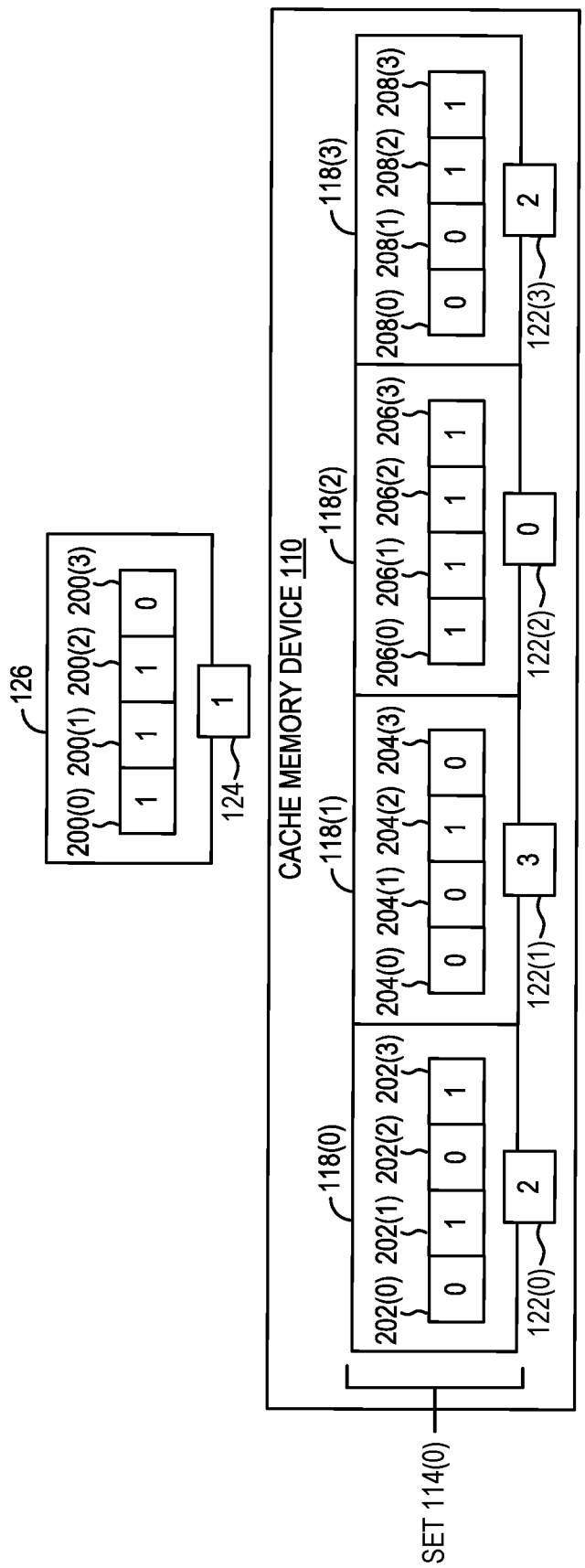
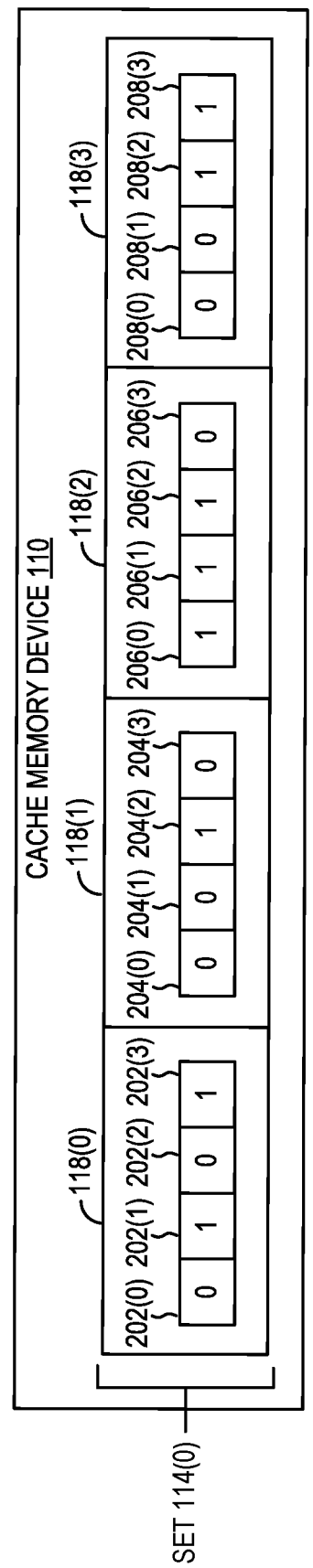
FIG. 3A
FIG. 3B

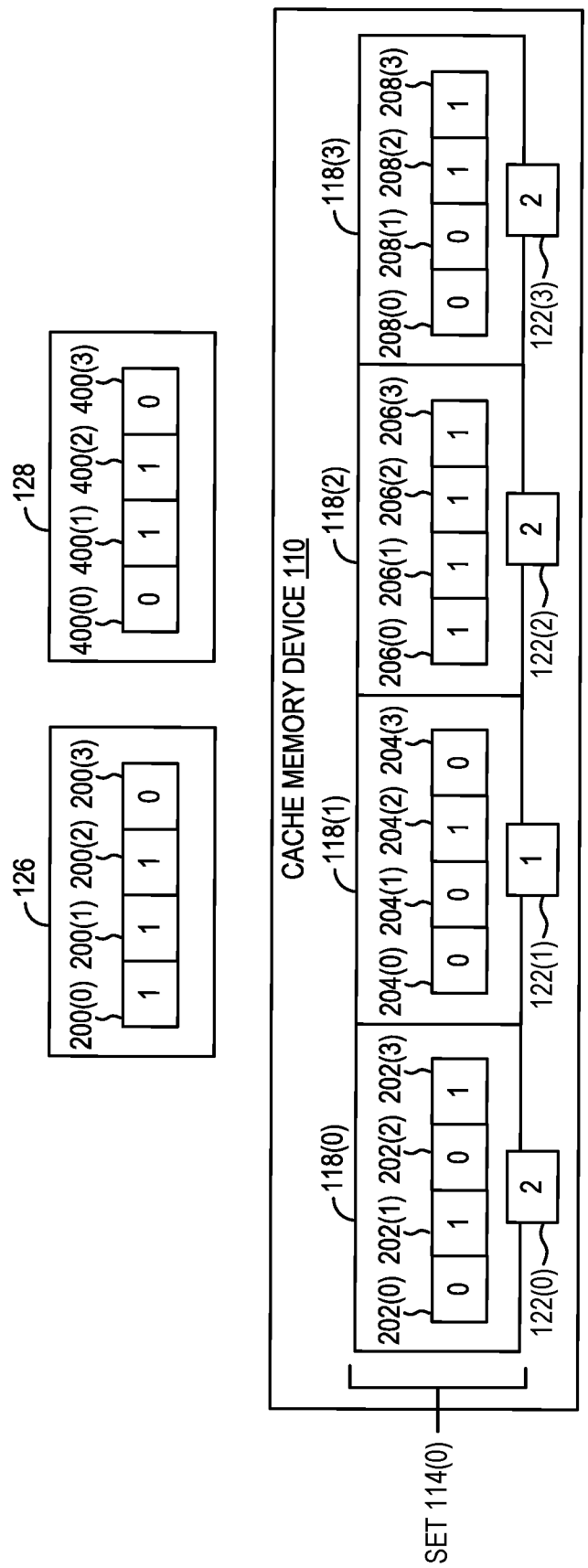
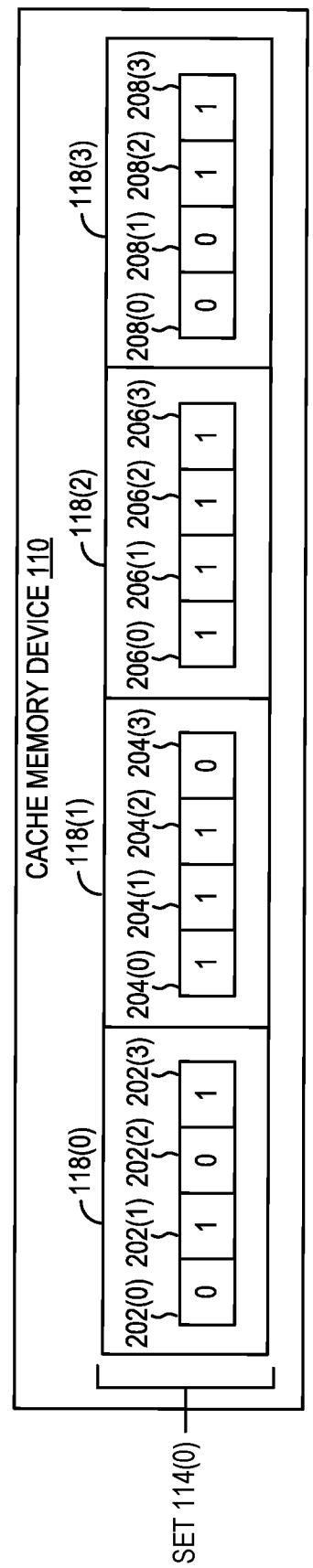
FIG. 4A
FIG. 4B

PROVIDING CONTENT-AWARE CACHE REPLACEMENT AND INSERTION POLICIES IN PROCESSOR-BASED DEVICES

BACKGROUND

I. Field of the Disclosure

The technology of the disclosure relates generally to the use of cache memory devices in processor-based devices, and, in particular, to cache replacement and insertion policies.

II. Background

Processor-based devices are subject to a phenomenon known as memory access latency, which is a time interval between the time the processor initiates a memory access request for data (i.e., by executing a memory load instruction) and the time the processor actually receives the requested data. If the memory access latency for a memory access request is large enough, the processor may be forced to stall further execution of instructions while waiting for a memory access request to be fulfilled. One approach to minimizing the effects of memory access latency is the use of cache memory devices (also referred to simply as "cache"). A cache is a memory device that has a smaller capacity than system memory, but that can be accessed faster by a processor due to the type of memory used and/or the physical location of the cache relative to the processor. The cache can be used to store copies of data retrieved from frequently accessed memory locations in the system memory (or from a higher-level cache such as a Last Level Cache (LLC)), thereby reducing memory access latency.

Because the capacity of a cache is limited, the cache may quickly fill up with copies of recently retrieved data. In such cases, the processor-based device may need to select a cache entry within the cache to evict and replace with newly retrieved data, and/or to determine whether to cache the result of a particular memory access request at all. To select a cache entry for eviction, the processor-based device may employ any of a number of cache replacement policies, including round-robin, Least-Recently-Used (LRU), and Most-Recently-Used (MRU) cache replacement policies, as non-limiting examples. However, for some caches such as LLCs, the miss rate associated with the cache may have a low sensitivity to different cache replacement policies, such that the selection of a given cache replacement policy may have a minimal effect on the number of misses encountered when using the cache. Moreover, conventional cache replacement and insertion policies may have little effect on other penalties associated with memory access requests, such as increased energy consumption associated with data movement of certain data values within a processor and/or between a processor and system memory.

SUMMARY OF THE DISCLOSURE

Aspects disclosed in the detailed description include providing content-aware cache replacement and insertion policies in processor-based devices. Related apparatus and methods are also disclosed. In this regard, in some exemplary aspects disclosed herein, a processor-based device provides a cache memory device and a cache controller circuit associated with the cache memory device. The cache controller circuit is configured to select a cached data value for eviction from the cache memory device based on a content cost of the cached data value, such that cached data values that have lower content costs are evicted sooner. As used herein, a "content cost" of a data value refers to a value corresponding to energy consumption by the processor-based device due to the bit values of a plurality of bits of the data value, such as energy consumption when storing and/or transferring the data value.

Accordingly, when the cache controller circuit determines that an eviction from the cache memory device is necessary, the cache controller circuit determines a content cost for each cached data value of a plurality of cached data values in the cache memory device (e.g., the cached data values stored in a plurality of ways of a set of the cache memory device). Each content cost is determined based on the bit values of a plurality of bits of each corresponding cached data value. For example, in some aspects, each content cost may comprise a count of occurrences of a specified bit value (e.g., a value of one (1) or a value of zero (0)) among the plurality of bit values of a corresponding cached data value. Some aspects may provide that each content cost may comprise a count of changes in each bit value among a plurality of bit values of a most recently evicted data value compared with bit values of a corresponding cached data value. The cache controller circuit uses the content costs to identify a cached data value of the plurality of cached data values that is associated with a lowest content cost as a target cached data value. The cache controller circuit then evicts the target cached data value from the cache memory device. In this manner, the cache controller circuit implements a content-aware cache replacement policy that ensures that subsequent re-transfer and/or re-storing of evicted data values will incur lower energy penalties, while retaining cached data values that would incur greater energy penalties if re-transferred and/or re-stored.

Some aspects may provide that the cache controller circuit may receive a data value to be cached and may also determine a content cost for the data value. In some such aspects, before identifying the target cached data value, the cache controller circuit may determine whether all of the plurality of content costs of the cached data values have a same value (i.e., whether there exists no particular cached data value that can be transferred from and/or stored in system memory at a lower energy penalty than any other cached data value). If so, the cache controller circuit may use an alternate cache replacement policy (e.g., a Least-Recently-Used cache replacement policy, as a non-limiting example) to identify the target cached data value. According to some such examples, if the cache controller circuit determines that not all of the plurality of content costs have the same value, the cache controller circuit may further determine whether the content cost of the data value to be cached is lower than all of the plurality of content costs (i.e., whether the data value to be cached has a lower energy penalty than any of the cached data values). If so, the cache controller circuit may bypass caching of the data value.

In some aspects, the cache controller circuit may receive a caching hint based on a plurality of bit values of a data value to be cached (e.g., from a client device such as a Neural Signal Processor (NSP), as a non-limiting example). The caching hint may comprise, for example, an indication that the data value is associated with a relatively high content cost or memory access latency or a relatively low content cost or memory access latency, such that the data value should or should not, respectively, be cached by the cache controller circuit. The cache controller circuit in such aspects may then determine, based on the caching hint, whether to cache the data value based on the caching hint, or to bypass caching of the data value.

In another aspect, a processor-based device is provided. The processor-based device comprises a cache memory device and a cache controller circuit of the cache memory device. The cache controller circuit is configured to determine a plurality of content costs for each of a plurality of cached data values in the cache memory device, based on a plurality of bit values of each of the plurality of cached data values. The cache controller circuit is configured to identify, based on the plurality of content costs, a cached data value of the plurality of cached data values associated with a lowest content cost as a target cached data value. The cache controller circuit is also configured to evict the target cached data value from the cache memory device.

In another aspect, a processor-based device is provided. The processor-based device comprises means for determining a plurality of content costs for each of a plurality of cached data values in a cache memory device, based on a plurality of bit values of each of the plurality of cached data values. The processor-based device further comprises means for identifying, based on the plurality of content costs, a cached data value of the plurality of cached data values associated with a lowest content cost as a target cached data value. The processor-based device also comprises means for evicting the target cached data value from the cache memory device.

In another aspect, a method for providing content-aware cache replacement and insertion policies in processor-based devices is provided. The method comprises determining, by a cache controller circuit, a plurality of content costs for each of a plurality of cached data values in a cache memory device, based on a plurality of bit values of each of the plurality of cached data values. The method further comprises identifying, by the cache controller circuit based on the plurality of content costs, a cached data value of the plurality of cached data values associated with a lowest content cost as a target cached data value. The method also comprises evicting, by the cache controller circuit, the target cached data value from the cache memory device.

In another aspect, a non-transitory computer-readable medium is provided. The non-transitory computer-readable medium stores thereon computer-executable instructions that, when executed, cause a processor to determine a plurality of content costs for each of a plurality of cached data values in a cache memory device, based on a plurality of bit values of each of the plurality of cached data values. The computer-executable instructions further cause the processor to identify, based on the plurality of content costs, a cached data value of the plurality of cached data values associated with a lowest content cost as a target cached data value. The computer-executable instructions also cause the processor to evict the target cached data value from the cache memory device.

BRIEF DESCRIPTION OF THE FIGURES

FIGS. 2A-2B are block diagrams that illustrate the use of a content-aware cache replacement policy by the cache controller circuit of FIG. 1 under which content costs are calculated based on occurrences of a bit value of one (1) in cached data values, according to some aspects;

FIGS. 3A-3B are block diagrams that illustrate the use of a content-aware cache replacement policy by the cache controller circuit of FIG. 1 under which content costs are calculated based on occurrences of a bit value of zero (0) in cached data values, according to some aspects;

FIGS. 4A-4B are block diagrams that illustrate the use of a content-aware cache replacement policy by the cache controller circuit of FIG. 1 under which content costs are calculated based on changes in bit values of a most recently evicted data value compared with bit values of cached data values, according to some aspects;

DETAILED DESCRIPTION

Figure 1:
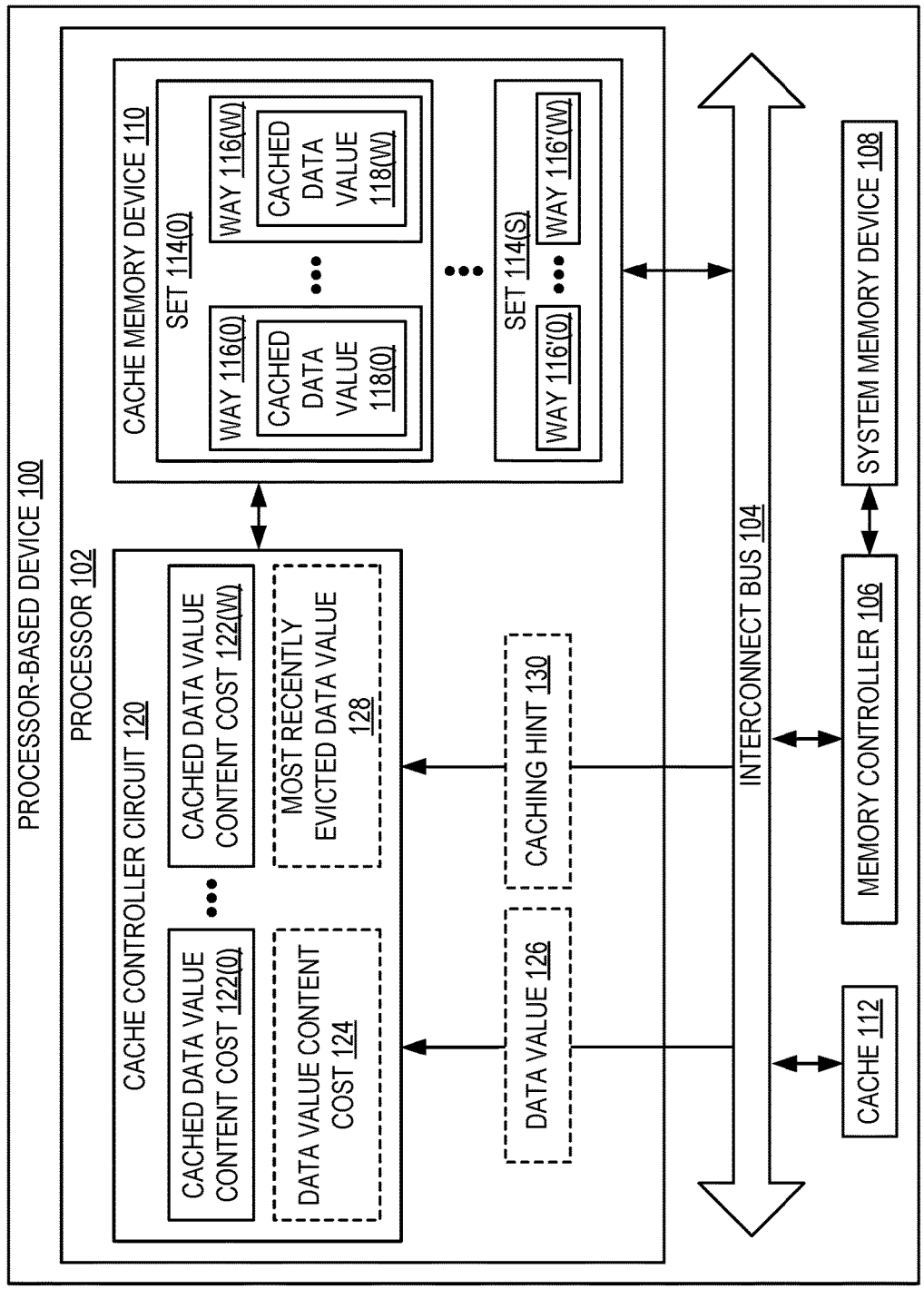
FIG. 1 is a block diagram of an exemplary processor-based device including a cache memory device and an associated cache controller circuit that is configured to provide content-aware cache replacement and insertion policies, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing content-aware cache replacement and insertion policies in processor-based devices. Related apparatus and methods are also disclosed. In this regard, in some exemplary aspects disclosed herein, a processor-based device provides a cache memory device and a cache controller circuit associated with the cache memory device. The cache controller circuit is configured to select a cached data value for eviction from the cache memory device based on a content cost of the cached data value, such that cached data values that have lower content costs are evicted sooner. As used herein, a "content cost" of a data value refers to a value corresponding to energy consumption by the processor-based device due to the bit values of a plurality of bits of the data value, such as energy consumption when storing and/or transferring the data value.

Accordingly, when the cache controller circuit determines that an eviction from the cache memory device is necessary, the cache controller circuit determines a content cost for each cached data value of a plurality of cached data values in the cache memory device (e.g., the cached data values stored in a plurality of ways of a set of the cache memory device). Each content cost is determined based on the bit values of a plurality of bits of each corresponding cached data value. For example, in some aspects, each content cost may comprise a count of occurrences of a specified bit value (e.g., a value of one (1) or a value of zero (0)) among the plurality of bit values of a corresponding cached data value. Some aspects may provide that each content cost may comprise a count of changes in each bit value among a plurality of bit values of a most recently evicted data value compared with bit values of a corresponding cached data value. The cache controller circuit uses the content costs to identify a cached data value of the plurality of cached data values that is associated with a lowest content cost as a target cached data value. The cache controller circuit then evicts the target cached data value from the cache memory device. In this manner, the cache controller circuit implements a content-aware cache replacement policy that ensures that subsequent re-transfer and/or re-storing of evicted data values will incur lower energy penalties, while retaining cached data values that would incur greater energy penalties if re-transferred and/or re-stored.

Some aspects may provide that the cache controller circuit may receive a data value to be cached and may also determine a content cost for the data value. In some such aspects, before identifying the target cached data value, the cache controller circuit may determine whether all of the plurality of content costs of the cached data values have a same value (i.e., whether there exists no particular cached data value that can be transferred from and/or stored in system memory at a lower energy penalty than any other cached data value). If so, the cache controller circuit may use an alternate cache replacement policy (e.g., a Least-Recently-Used cache replacement policy, as a non-limiting example) to identify the target cached data value. According to some such examples, if the cache controller circuit determines that not all of the plurality of content costs have the same value, the cache controller circuit may further determine whether the content cost of the data value to be cached is lower than all of the plurality of content costs (i.e., whether the data value to be cached has a lower energy penalty than any of the cached data values). If so, the cache controller circuit may bypass caching of the data value.

In some aspects, the cache controller circuit may receive a caching hint based on a plurality of bit values of a data value to be cached (e.g., from a client device such as a Neural Signal Processor (NSP), as a non-limiting example). The caching hint may comprise, for example, an indication that the data value is associated with a relatively high content cost or memory access latency or a relatively low content cost or memory access latency, such that the data value should or should not, respectively, be cached by the cache controller circuit. The cache controller circuit in such aspects may then determine, based on the caching hint, whether to cache the data value based on the caching hint, or to bypass caching of the data value.

In this regard, FIG. 1 illustrates an exemplary processor-based device 100 that provides a processor 102 for providing content-aware cache replacement and insertion policies. The processor 102 in some aspects may comprise a central processing unit (CPU) having one or more processor cores, and in some exemplary aspects may be one of a plurality of similarly configured processors (not shown) of the processor-based device 100. The processor 102 is communicatively coupled to an interconnect bus 104, which in some embodiments may include additional constituent elements (e.g., a bus controller circuit and/or an arbitration circuit, as non-limiting examples) that are not shown in FIG. 1 for the sake of clarity.

The processor 102 is also communicatively coupled, via the interconnect bus 104, to a memory controller 106 that controls access to a system memory device 108 and manages the flow of data to and from the system memory device 108. The system memory device 108 provides addressable memory used for data storage by the processor-based device 100, and as such may comprise dynamic random access memory (DRAM), as a non-limiting example. The processor 102 of FIG. 1 further includes a cache memory device 110 that may be used to cache local copies of frequently accessed data within the processor 102 for quicker access. The cache memory device 110 in some aspects may comprise, e.g., a Level 1 (L1) cache. The processor 102 in the example of FIG. 1 is also communicatively coupled, via the interconnect bus 104, to a cache memory device (captioned as "CACHE" in FIG. 1) 112, which may comprise, e.g., a Level 2 (L2) cache, a Level 3 (L3) cache, or a last-level cache (LLC). The cache memory device 110 and the cache memory device 112 together make up a hierarchical cache structure used by the processor-based device 100 to cache frequently accessed data for faster retrieval (compared to retrieving data from the system memory device 108).

As seen in FIG. 1, the cache memory device 110 is organized into a plurality of sets (captioned as "SET" in FIG. 1) 114(0)-114(S) that each comprise a plurality of ways such as the ways (captioned as "WAY" in FIG. 1) 116(0)-116(W) and 116'(0)-116'(W), and the cache memory device 110 is configured to support a corresponding level of associativity. Each of the plurality of ways 116(0)-116(W), 116'(0-116'(W) of the sets 114(0)-114(S) is configured to store cached data values such as the cached data values 118(0)-118(W) of the ways 116(0)-116(W), which represent data retrieved at an earlier time from the system memory device 108 or from a higher-level cache such as the cache memory device 112. The cached data values 118(0)-118(W) may each comprise, e.g., a cache line, and may be associated with tags (not shown) that store information that enables the corresponding cache lines to be mapped to unique memory addresses. It is to be understood that the cached data values 118(0)-118(W) of the cache memory device 110 may be associated with other data elements, such as validity indicators and/or dirty data indicators, that are also not shown in FIG. 1 for the sake of clarity.

The processor-based device 100 of FIG. 1 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the processor 102 may further include more or fewer memory devices, execution pipeline stages, controller circuits, buffers, and/or caches, which are omitted from FIG. 1 for the sake of clarity.

As noted above, caches such as the cache memory device 110 and the cache memory device 112 may be employed to minimize the effects of memory access latency encountered by the processor 102 when performing memory access operations on the system memory device 108 or higher-level caches such as the cache memory device 112. However, for some caches, the selection of a cache replacement policy may have minimal effect on the miss rate encountered by the processor-based device 100 when using the cache. Moreover, conventional cache replacement and insertion policies do not take into account other penalties that may be associated with memory access requests. One such penalty, in some aspects, is energy consumption associated with data movement within the processor 102 or between the processor 102 and the system memory device 108 and/or data storage in the system memory device 108. For example, when transferring data, a device such as a DRAM module that employs off-chip terminated interconnects may consume energy only when transferring a bit value of one (1), while not consuming energy when transferring a bit value of zero (0). In contrast, a device such as a System-on-Chip (SoC) that employs on-chip unterminated interconnects may consume energy only when a bit value transitions from one value to another (i.e., from a value of zero (0) to a value of one (1) and vice versa). Similarly, some memory devices may consume more refresh energy when storing data values comprising more bit values of one (1) then bit values of zero (0).

Accordingly, in this regard, the processor 102 provides a cache controller circuit 120 to provide content-aware cache replacement and insertion policies. In the example illustrated in FIG. 1, the cache controller circuit 120 is shown as an element separate from the cache memory device 110. However, it is to be understood that the cache controller circuit 120 in some aspects may be provided as an integral element of the cache memory device 110 or vice versa. The cache controller circuit 120 is configured to employ a content-aware cache replacement policy that is based on content costs (captioned as "CACHED DATA VALUE CONTENT COST" in FIG. 1) 122(0)-122(W) that are calculated for cached data values such as the cached data values 118(0)-118(W), and that are used to select one of the cached data values 118(0)-118(W) having a lowest content cost 122(0)-122(W) as a target cached data value for eviction.

The content costs 122(0)-122(W) are determined by the cache controller circuit 120 based on bit values of a plurality of bits (not shown) of each cached data value. The calculation of the content costs 122(0)-122(W) may vary in different implementations, depending on how the processor-based device 100 consumes energy when transferring and/or storing each bit value. For example, in some aspects, each of the content costs 122(0)-122(W) may comprise a count of occurrences of a specified bit value (e.g., a value of one (1) or a value of zero (0)) among the plurality of bit values of corresponding cached data values 118(0)-118(W). The content costs 122(0)-122(W) in some such aspects may be compared with a content cost (captioned as "DATA VALUE CONTENT COST" in FIG. 1) 124 of a data value 126 that is received by the cache controller circuit 120 to be cached. Examples of determining the content costs 122(0)-122(W) according to these aspects are discussed in greater detail below with respect to FIGS. 2A-2B and 3A-3B.

Some aspects may provide that the cache controller circuit 120 is configured to track a most recently evicted data value 128 that represents a value of a cached data value that was last evicted from the cache memory device 110. In such aspects, the content costs 122(0)-122(W) may comprise a count of changes in each bit value among a plurality of bit values (not shown) of the most recently evicted data value 128 compared with a corresponding bit value among the plurality of bit values of each of the cached data values 118(0)-118(W). Examples of determining the content costs 122(0)-122(W) according to these aspects are discussed in greater detail below with respect to FIGS. 4A-4B.

The cache controller circuit 120 uses the content costs 122(0)-122(W) to identify a cached data value of the plurality of cached data values 118(0)-118(W) (e.g., the cached data value 118(0), as a non-limiting example) that is associated with a lowest content cost as a target cached data value 118(0). The cache controller circuit 120 then evicts the target cached data value 118(0) from the cache memory device 110. By evicting the target cached data value 118(0) having the lowest content cost among the content costs 122(0)-122(W), the cache controller circuit 120 can ensure that the processor-based device 100 will incur lower energy penalties if and when the target cached data value 118(0) is subsequently re-transferred and/or re-stored, while retaining the cached data values 118(1)-118(W) that would incur greater energy penalties if re-transferred and/or re-stored.

As noted above, the cache controller circuit 120 in some aspects may receive the data value 126 to be cached and may determine the content cost 124 for the data value 126. In some such aspects, before identifying the target cached data value 118(0), the cache controller circuit 120 may determine whether all of the plurality of content costs 122(0)-122(W) of the cached data values 118(0)-118(W) have a same value. If so, this indicates that none of the cached data values 118(0)-118(W) can be retrieved or transferred with a lower energy penalty than any of the other cached data values 118(0)-118(W). Thus, the cache controller circuit 120 in such aspects may use an alternate replacement cache policy (e.g., a Least-Recently-Used cache replacement policy, as a non-limiting example) to identify the target cached data value. Some such examples may further provide that, if the cache controller circuit 120 determines that not all of the content costs 122(0)-122(W) have the same value, the cache controller circuit 120 determines whether the content cost 124 of the data value 126 to be cached is lower than all of the plurality of content costs 122(0)-122(W). This would indicate that the data value 126 to be cached can be retrieved or transferred with a lower energy penalty than any of the cached data values 118(0)-118(W). In such a case, the cache controller circuit 120 would bypass caching of the data value 126.

According to some aspects, a client device (not shown) from which the cache controller circuit 120 receives the data value 126 may provide a caching hint 130 based on the plurality of bit values of the data value 126. For example, in aspects in which the client device is an NSP, the NSP may determine that the contents of the data value 126 (e.g., lookup tables, neural network weights, or the like) skew towards containing more of a particular data value (e.g., more zeroes (0s) than ones (1) or vice versa). The client device therefore may provide the caching hint 130 to the cache controller circuit 120 to indicate that the data value 126 is associated with a relatively high content cost or memory access latency or a relatively low content cost or memory access latency (such that the data value 126 should or should not, respectively, be cached by the cache controller circuit 120). Based on the caching hint 130, the cache controller circuit 120 in such aspects may then determine whether to cache the data value 126 based on the caching hint 130, or to bypass caching of the data value 126.

As noted above, the content costs 122(0)-122(W) are determined based on the plurality of bit values of cached data values 118(0)-118(W), and in some aspects may be compared with the content cost 124 of the data value 126 when providing a content-aware cache replacement policy. To illustrate the use of a content-aware cache replacement policy by the cache controller circuit 120 of FIG. 1 under which the content costs 122(0)-122(W) are calculated based on the number of occurrences of a bit value of one (1) in the cached data values 118(0)-118(W), FIGS. 2A-2B are provided. In FIG. 2A, the data value 126 is to be cached by the cache controller circuit 120 of FIG. 1 in the set 114(0) of the cache memory device 110, and thus one of the cached data values 118(0)-118(3) (i.e., the cached data values 118(0)-118(W) of FIG. 1, where W=3 for the sake of illustration) will be identified as a target cached data value to be evicted. To simplify the example shown, the data value 126 and the cached data values 118(0)-118(3) are each shown as comprising four (4) bits; however, it is to be understood that some aspects may provide that the data value 126 and the cached data values 118(0)-118(3) comprise more than four (4) bits. Additionally, the ways 116(0)-116(W) in which the cached data values 118(0)-118(W) are stored are omitted from FIGS. 2A-2B for the sake of clarity.

In the example of FIG. 2A, the cache controller circuit 120 determines a content cost 124 for the data value 126 based on bit values 200(0)-200(3) of the data value 126. The cache controller circuit 120 also determines the content costs 122(0)-122(3) for the corresponding cached data values 118(0)-118(3), based on respective bit values 202(0)-202(3), 204(0)-204(3), 206(0)-206(3), and 208(0)-208(3). Because the content-aware cache replacement policy being applied in this example is based on occurrences of a bit value of one (1), the content cost 124 of the data value 126 is determined to have a value of three (3), while the content costs 122(0)-122(3) for the cached data values 118(0)-118(3) are determined to have values of two (2), one (1), four (4), and two (2), respectively. The cached data value 118(1) is thus identified as having the lowest content cost 122(1), and consequently the cache controller circuit 120 identifies the cached data value 118(1) as the target cached data value 118(1). As seen in FIG. 2B, the cache controller circuit 120 evicts the target cached data value 118(1), and installs the data value 126 as the new cached data value 118(1).

FIGS. 3A-3B illustrate the use of a content-aware cache replacement policy by the cache controller circuit 120 of FIG. 1 that is similar to that of FIGS. 2A-2B, except that the content costs 122(0)-122(W) are calculated based on the number of occurrences of a bit value of zero (0) in the cached data values 118(0)-118(W). As seen in FIGS. 3A-3B, the bit values 200(0)-200(3) of the data value 126 to be cached, along with the bit values 202(0)-202(3), 204(0)-204(3), 206(0)-206(3), and 208(0)-208(3) of respective cached data values 118(0)-118(3), have the same values shown in FIG. 2A. Because the content-aware cache replacement policy being applied in this example is based on occurrences of a bit value of zero (0), the content cost 124 of the data value 126 is determined to have a value of one (1), while the content costs 122(0)-122(3) for the cached data values 118(0)-118(3) are determined to have values of two (2), three (3), zero (0), and two (2), respectively. Accordingly, the cache controller circuit 120 in this example identifies the cached data value 118(2) as having the lowest content cost 122(2), and as a result the cache controller circuit 120 identifies the cached data value 118(2) as the target cached data value 118(2). As shown in FIG. 3B, the cache controller circuit 120 evicts the target cached data value 118(2), and installs the data value 126 as the new cached data value 118(2).

FIGS. 4A-4B illustrate the use of a content-aware cache replacement policy by the cache controller circuit 120 of FIG. 1 in which each of the content costs 122(0)-122(W) comprises a count of changes in bit values among a plurality of bit values 400(0)-400(3) of the most recently evicted data value 128 of FIG. 1 compared with corresponding bit values 202(0)-202(3), 204(0)-204(3), 206(0)-206(3), and 208(0)-208(3) of respective cached data values 118(0)-118(3). In FIGS. 4A-4B, the bit values 200(0)-200(3) of the data value 126 to be cached, along with the bit values 202(0)-202(3), 204(0)-204(3), 206(0)-206(3), and 208(0)-208(3) of respective cached data values 118(0)-118(3), have the same values shown in FIG. 2A. To calculate, e.g., the content cost 122(0) of the cached data value 118(0), the bit values 400(0)-400(3) of the most recently evicted data value 128 are compared with the bit values 202(0)-202(3), and the number of changes in bit value between corresponding bits are counted. While the bit values 400(0) and 202(0) are the same (i.e., zero (0)) and the bit values 400(1) and 202(1) are the same (i.e., one (1)), the bit values 400(2) and 202(2) and the bit values 400(3) and 202(3) each represent a change in bit value (from one (1) to zero (0) and from zero (0) to one (1), respectively). The content cost 122(0) of the cached data value 118(0) is thus determined to be two (2). The content costs 122(1)-122(3) are similarly determined as having values of one (1), two (2), and two (2), respectively. Accordingly, the cache controller circuit 120 in this example identifies the cached data value 118(1) as having the lowest content cost 122(1), and consequently the cache controller circuit 120 identifies the cached data value 118(1) as the target cached data value 118(1). As seen in FIG. 4B, the cache controller circuit 120 evicts the target cached data value 118(1), and installs the data value 126 as the new cached data value 118(1).

Figure 5A:
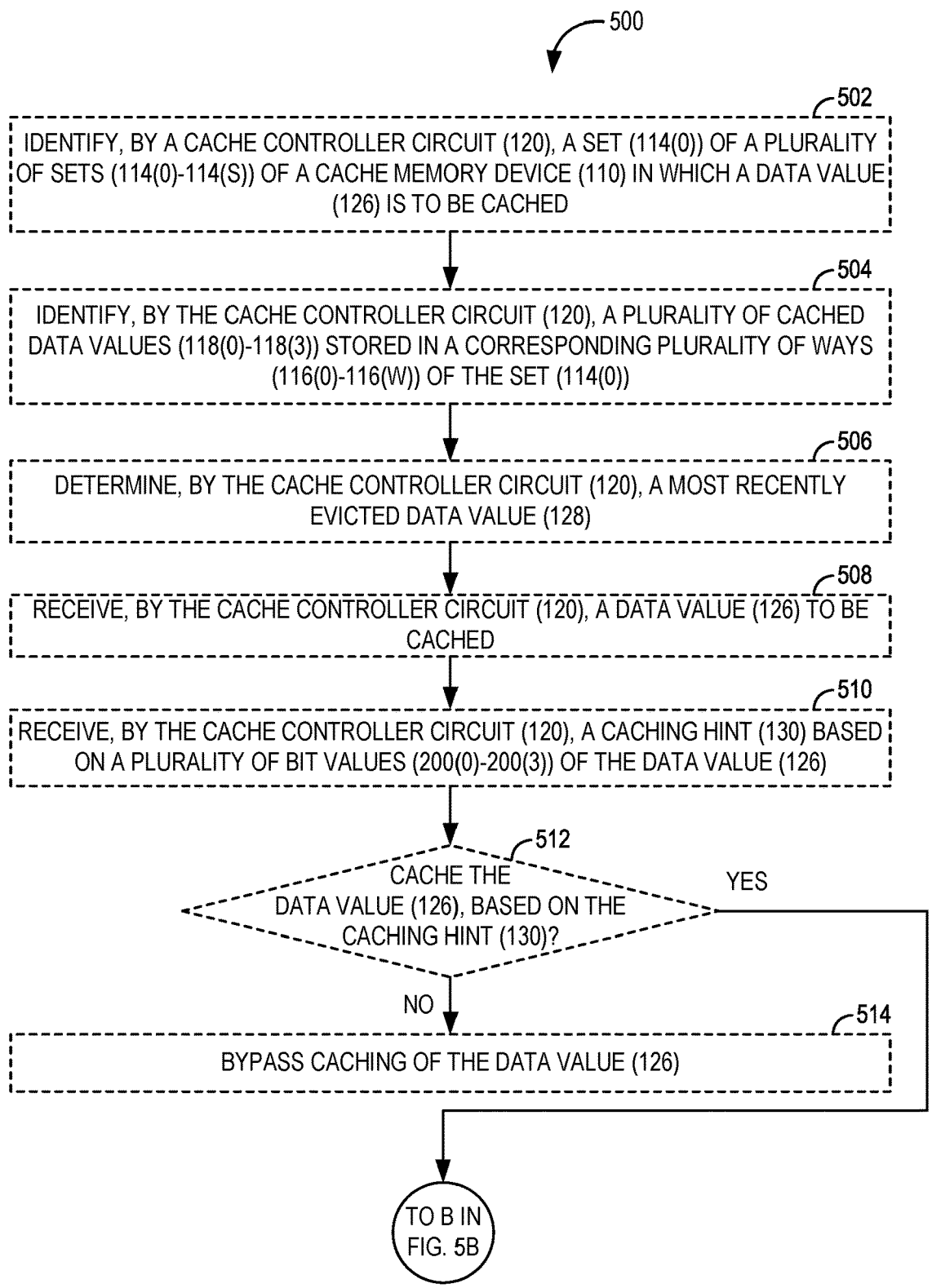
FIGS. 5A-5D are flowcharts illustrating exemplary operations by the cache controller circuit of FIG. 1 for providing content-aware cache replacement and insertion policies, according to some aspects.

To further describe operations of the cache controller circuit 120 of FIG. 1 for providing content-aware cache replacement and insertion policies, FIGS. 5A-5D provide a flowchart illustrating exemplary operations 500. For the sake of clarity, elements of FIGS. 1, 2A-2B, 3A-3B, and 4A-4B are referenced in describing FIGS. 5A-5D. It is to be understood that some aspects may provide that some operations illustrated in FIGS. 5A-5D may be performed in an order other than that illustrated herein and/or may be omitted. In FIG. 5A, the exemplary operations 500 in some aspects begin with the processor 102 of FIG. 1 (e.g., using the cache controller circuit 120 of FIG. 1) identifying a set of a plurality of sets of a cache memory device (e.g., the set 114(0) of the plurality of sets 114(0)-114(S) of the cache memory device 110 of FIG. 1) in which a data value (e.g., the data value 126 of FIGS. 1, 2A-2B, and 3A-3B) is to be cached (block 502). The cache controller circuit 120 in such aspects may then identify a plurality of cached data values (e.g., the plurality of cached data values 118(0)-118(3) of FIGS. 2A-2B, 3A-3B, and 4A-4B) stored in a corresponding plurality of ways (e.g., the plurality of ways 116(0)-116(W) of FIG. 1) of the set 114(0) (block 504).

The cache controller circuit 120 according to some aspects (e.g., aspects in which content costs are calculated based on changes in bit values of a most recently evicted data value compared with bit values of cached data values) may determine a most recently evicted data value, such as the most recently evicted data value 128 of FIGS. 1 and 4A-4B (block 506). Some aspects may provide that the cache controller circuit 120 receives a data value, such as the data value 126 of FIGS. 1, 2A-2B, 3A-3B, and 4A-4B, to be cached (block 508). In some aspects, the cache controller circuit 120 may receive a caching hint (e.g., the caching hint 130 of FIG. 1) based on a plurality of bit values (e.g., the bit values 200(0)-200(3) of FIGS. 2A-2B, 3A-3B, and 4A-4B) of the data value 126 (block 510). The cache controller circuit 120 in such aspects may then determine whether to cache the data value 126 based on the caching hint 130 (block 512). If not, the cache controller circuit 120 bypasses caching of the data value 126 (block 514). However, if the cache controller circuit 120 determines at decision block 512 to cache the data value 126 (or if the cache controller circuit 120 embodies an aspect which the caching hint 130 is not used), the exemplary operations 500 continue at block 516 of FIG. 5B.

Figure 5B:
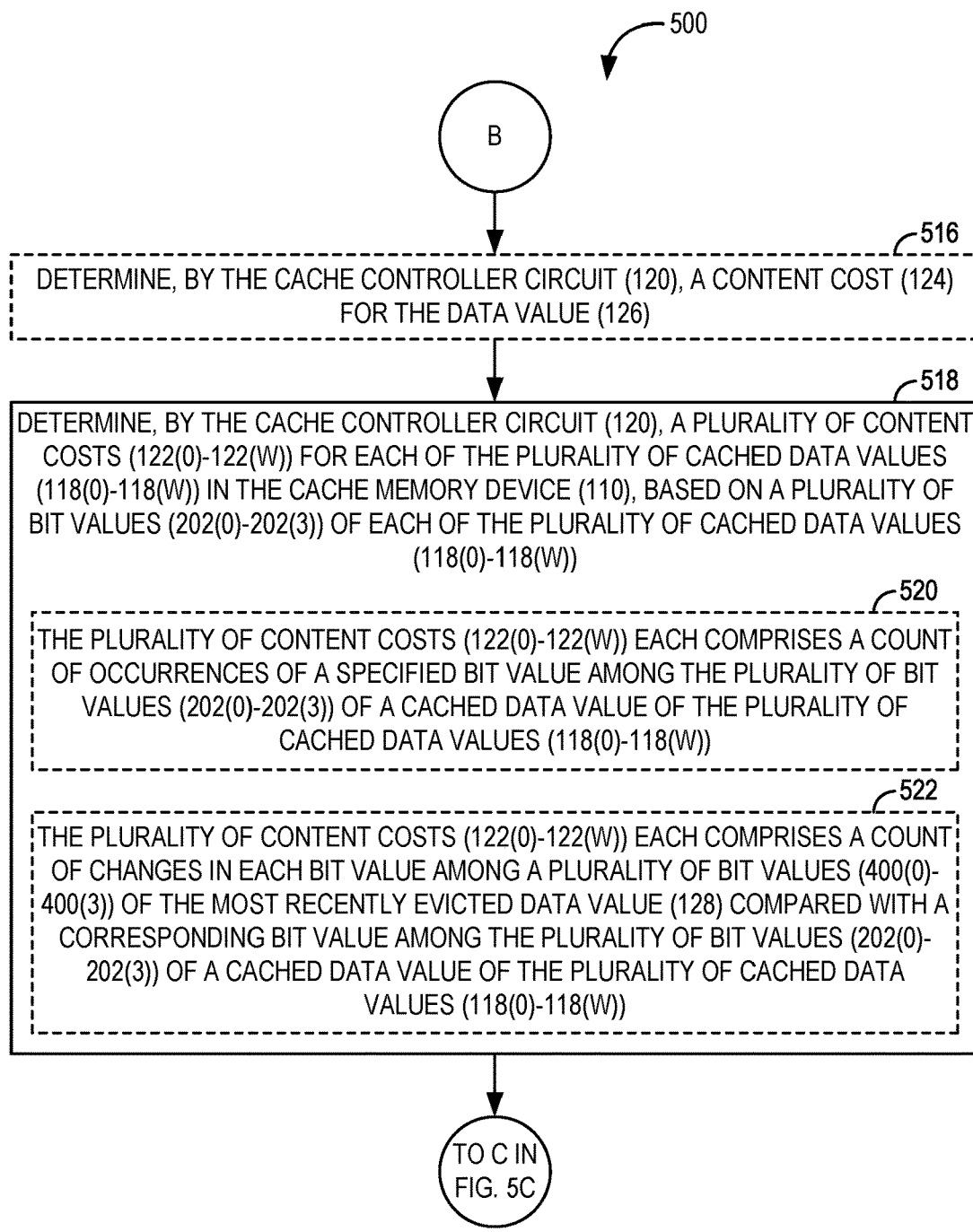

Referring now to FIG. 5B, the exemplary operations 500 continue in some aspects with the cache controller circuit 120 determining a content cost (e.g., the content cost 124 of FIGS. 1, 2A-2B, 3A-3B, and 4A-4B) for the data value 126 (block 516). The cache controller circuit 120 determines a plurality of content costs (e.g., the plurality of content costs 122(0)-122(W) of FIGS. 1, 2A-2B, 3A-3B, and 4A-4B) for each of the plurality of cached data values 118(0)-118(W) in the cache memory device 110, based on a plurality of bit values (e.g., the plurality of bit values 202(0)-202(3) of FIGS. 2A-2B, 3A-3B, and 4A-4B) of each of the plurality of cached data values 118(0)-118(W) (block 518). In some aspects, the operations of block 518 for determining the plurality of content costs 122(0)-122(W) may include the plurality of content costs 122(0)-122(W) each comprising a count of occurrences of a specified bit value among the plurality of bit values 202(0)-202(3) of a cached data value of the plurality of cached data values 118(0)-118(W) (block 520). Some aspects may provide that the operations of block 518 for determining the plurality of content costs 122(0)-122(W) include the plurality of content costs 122(0)-122(W) each comprising a count of changes in each bit value among a plurality of bit values (e.g., the plurality of bit values 400(0)-400(3) of FIGS. 4A-4B) of the most recently evicted data value 128 compared with a corresponding bit value among the plurality of bit values 202(0)-202(3) of a cached data value of the plurality of cached data values 118(0)-118(W) (block 522). The exemplary operations 500 in some aspects then continue at block 524 of FIG. 5C.

Figure 5C:
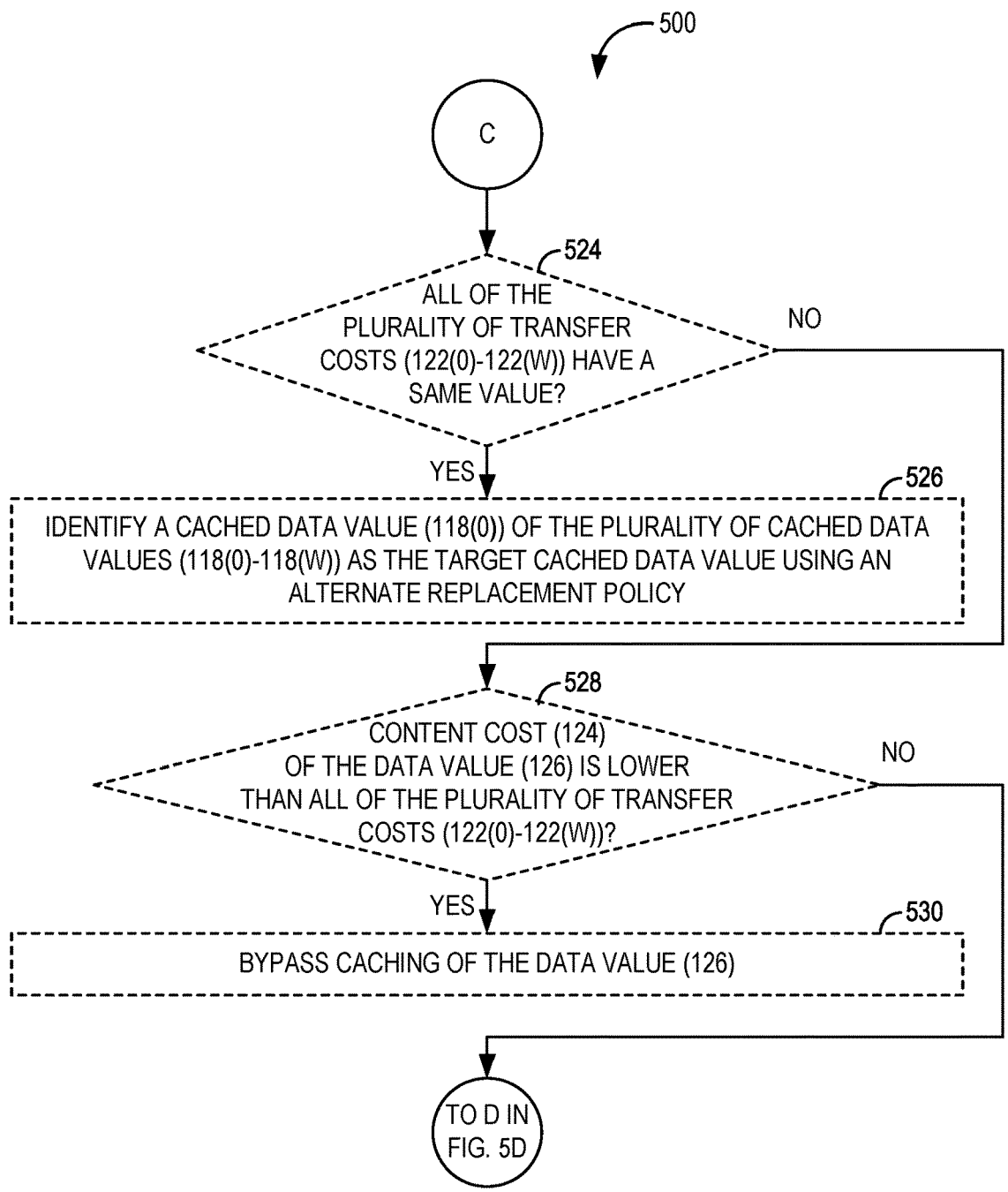

Turning now to FIG. 5C, the exemplary operations 500 continue with the cache controller circuit 120 determining whether all of the plurality of content costs 122(0)-122(W) have a same value (block 524). If so, the cache controller circuit 120 identifies a cached data value (e.g., the cached data value 118(0) of FIGS. 1, 2A-2B, 3A-3B, and 4A-4B) of the plurality of cached data values 118(0)-118(W) as the target cached data value using an alternate cache replacement policy (block 526). However, if the cache controller circuit 120 determines at decision block 524 that not all of the plurality of content costs 122(0)-122(W) have the same value, the cache controller circuit 120 in some aspects may determine whether the content cost 124 of the data value 126 is lower than all of the plurality of content costs 122(0)-122(W) (block 528). If so, the cache controller circuit 120 bypasses caching of the data value 126 (block 530). If the cache controller circuit 120 determines at decision block 528 that the content cost 124 of the data value 126 is not lower than all of the plurality of content costs 122(0)-122(W), the exemplary operations 500 continue at block 532 of FIG. 5D.

Figure 5D:
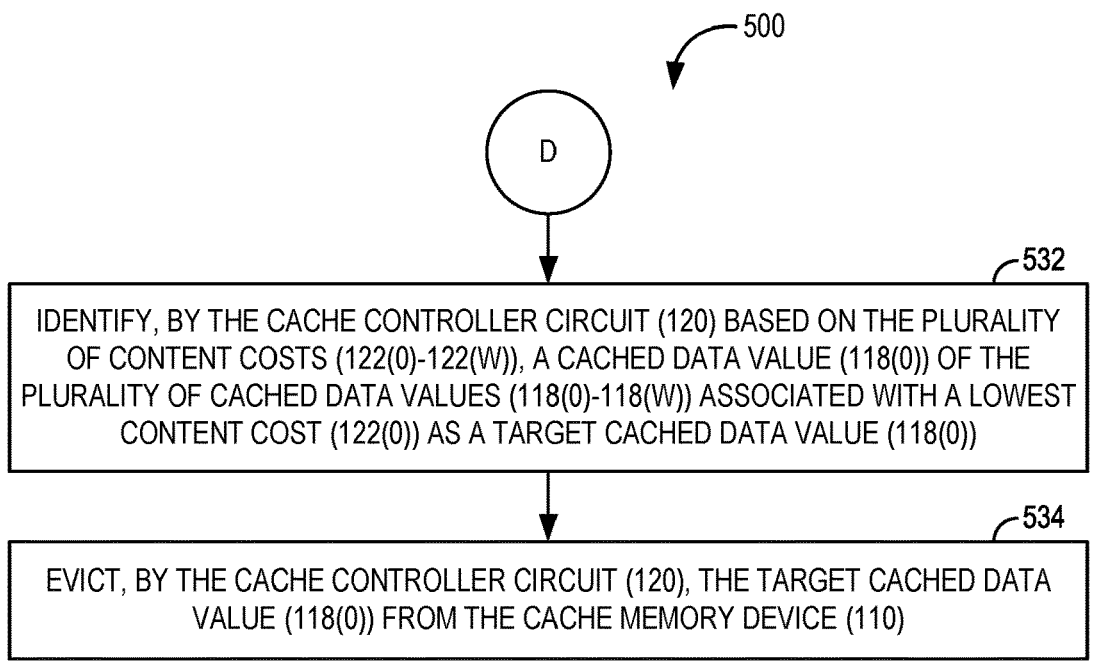

With continuing reference now to FIG. 5D, the exemplary operations 500 continue with the cache controller circuit identifying, based on the plurality of content costs 122(0)-122(W), a cached data value (e.g., the cached data value 118(0) of FIGS. 2A-2B, 3A-3B, and 4A-4B) of the plurality of cached data values 118(0)-118(W) associated with a lowest content cost (e.g., the content cost 122(0) of FIGS. 1, 2A-2B, 3A-3B, and 4A-4B) as a target cached data value 118(0) (block 532). The cache controller circuit 120 then evicts the target cached data value 118(0) from the cache memory device 110 (block 534).

Providing content-aware cache replacement and insertion policies in processor-based devices as disclosed in aspects described herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
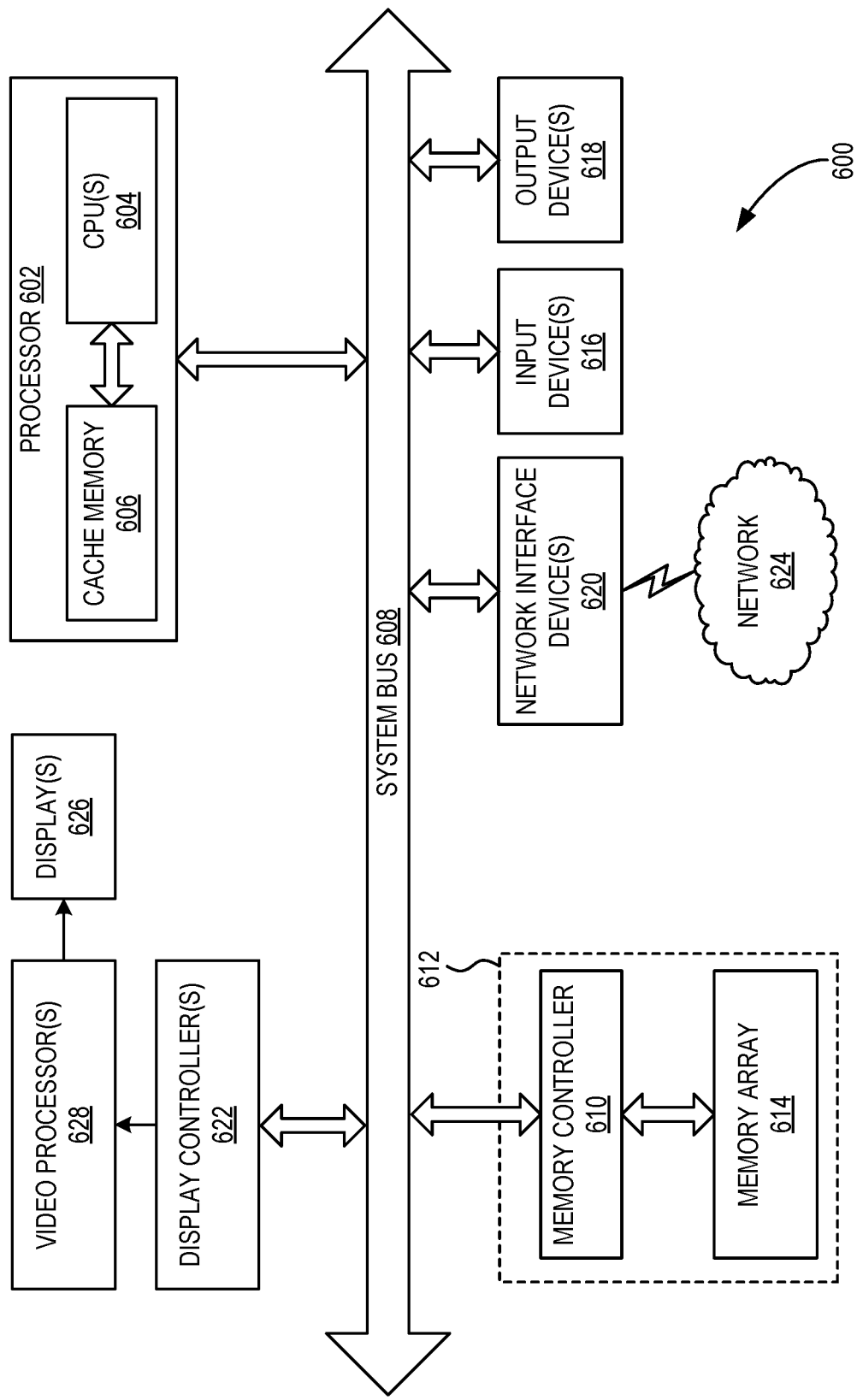
FIG. 6 is a block diagram of an exemplary processor-based device that can include the processor-based device of FIG. 1.

In this regard, FIG. 6 illustrates an example of a processor-based device 600 that may comprise the processor-based device 100 illustrated in FIG. 1. In this example, the processor-based device 600 includes a processor 602 that includes one or more central processing units (captioned as "CPUs" in FIG. 6) 604, which may also be referred to as CPU cores or processor cores. The processor 602 may have cache memory 606 coupled to the processor 602 for rapid access to temporarily stored data. The processor 602 is coupled to a system bus 608 and can intercouple master and slave devices included in the processor-based device 600. As is well known, the processor 602 communicates with these other devices by exchanging address, control, and data information over the system bus 608. For example, the processor 602 can communicate bus transaction requests to a memory controller 610, as an example of a slave device. Although not illustrated in FIG. 6, multiple system buses 608 could be provided, wherein each system bus 608 constitutes a different fabric.

Other master and slave devices can be connected to the system bus 608. As illustrated in FIG. 6, these devices can include a memory system 612 that includes the memory controller 610 and a memory array(s) 614, one or more input devices 616, one or more output devices 618, one or more network interface devices 620, and one or more display controllers 622, as examples. The input device(s) 616 can include any type of input device, including but not limited to input keys, switches, voice processors, etc. The output device(s) 618 can include any type of output device, including, but not limited to, audio, video, other visual indicators, etc. The network interface device(s) 620 can be any device configured to allow exchange of data to and from a network 624. The network 624 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 620 can be configured to support any type of communications protocol desired.

The processor 602 may also be configured to access the display controller(s) 622 over the system bus 608 to control information sent to one or more displays 626. The display controller(s) 622 sends information to the display(s) 626 to be displayed via one or more video processors 628, which process the information to be displayed into a format suitable for the display(s) 626. The display controller(s) 622 and/or the video processors 628 may be comprise or be integrated into a GPU. The display(s) 626 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
    a cache memory device; and
    a cache controller circuit of the cache memory device, the cache controller circuit configured to:
        determine a plurality of content costs for each of a plurality of cached data values in the cache memory device, based on a plurality of bit values of each of the plurality of cached data values;
        based on the plurality of content costs, identify a cached data value of the plurality of cached data values associated with a lowest content cost as a target cached data value; and
        evict the target cached data value from the cache memory device.

2. The processor-based device of clause 1, wherein:
    the cache memory device comprises a plurality of sets, each comprising a plurality of ways;
    the cache controller circuit is further configured to:
        identify a set of the cache memory device in which a data value is to be cached; and
        identify the plurality of cached data values stored in a corresponding plurality of ways of the set.

3. The processor-based device of any one of clauses 1-2, wherein the plurality of content costs each comprises a count of occurrences of a specified bit value among the plurality of bit values of a cached data value of the plurality of cached data values.

4. The processor-based device of any one of clauses 1-2, wherein:
    the cache memory device is further configured to determine a most recently evicted data value; and
    the plurality of content costs each comprises a count of changes in each bit value among a plurality of bit values of the most recently evicted data value compared with a corresponding bit value among the plurality of bit values of a cached data value of the plurality of cached data values.

5. The processor-based device of any one of clauses 1-4, wherein:
    the cache controller circuit is further configured to:
        determine whether all of the plurality of content costs have a same value; and
        identify the cached data value of the plurality of cached data values as the target cached data value using an alternate cache replacement policy, responsive to determining that all of the plurality of content costs have the same value; and
    the cache controller circuit is configured to identify the cached data value of the plurality of cached data values associated with the lowest content cost as the target cached data value responsive to determining that all of the plurality of content costs do not have the same value.

6. The processor-based device of any one of clauses 1-5, wherein:
    the cache controller circuit is further configured to:
        receive a data value to be cached;
        determine a content cost for the data value;
        determine whether the content cost of the data value is lower than all of the plurality of content costs; and
        responsive to determining that the content cost of the data value is lower than all of the plurality of content costs, bypass caching of the data value; and
    the cache controller circuit is configured to identify the cached data value of the plurality of cached data values associated with the lowest content cost as the target cached data value responsive to determining that the content cost of the data value is not lower than all of the plurality of content costs.

7. The processor-based device of any one of clauses 1-6, wherein:
   the cache controller circuit is further configured to:
      receive a data value to be cached;
      receive a caching hint based on a plurality of bit values of the data value;
      determining, based on the caching hint, whether to cache the data value; and
      responsive to determining not to cache the data value, bypassing caching of the data value; and
   the cache controller circuit is configured to identify the cached data value of the plurality of cached data values associated with the lowest content cost as the target cached data value responsive to determining to cache the data value.

8. The processor-based device of any one of clauses 1-7, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A processor-based device, comprising:
   means for determining a plurality of content costs for each of a plurality of cached data values in a cache memory device, based on a plurality of bit values of each of the plurality of cached data values;
   means for identifying, based on the plurality of content costs, a cached data value of the plurality of cached data values associated with a lowest content cost as a target cached data value; and
   means for evicting the target cached data value from the cache memory device.

10. A method for providing content-aware cache replacement and insertion policies, the method comprising:
   determining, by a cache controller circuit, a plurality of content costs for each of a plurality of cached data values in a cache memory device, based on a plurality of bit values of each of the plurality of cached data values;
   identifying, by the cache controller circuit based on the plurality of content costs, a cached data value of the plurality of cached data values associated with a lowest content cost as a target cached data value; and
   evicting, by the cache controller circuit, the target cached data value from the cache memory device.

11. The method of clause 10, further comprising:
   identifying, by the cache controller circuit, a set of a plurality of sets of the cache memory device in which a data value is to be cached; and
   identifying, by the cache controller circuit, the plurality of cached data values stored in a corresponding plurality of ways of the set.

12. The method of any one of clauses 10-11, wherein the plurality of content costs each comprises a count of occurrences of a specified bit value among the plurality of bit values of a cached data value of the plurality of cached data values.

13. The method of any one of clauses 10-11, further comprising determining, by the cache controller circuit, a most recently evicted data value;
   wherein the plurality of content costs each comprises a count of changes in each bit value among a plurality of bit values of the most recently evicted data value compared with a corresponding bit value among the plurality of bit values of a cached data value of the plurality of cached data values.

14. The method of any one of clauses 10-13, further comprising determining, by the cache controller circuit, that all of the plurality of content costs do not have a same value;
   wherein identifying the cached data value of the plurality of cached data values associated with the lowest content cost as the target cached data value is responsive to determining that all of the plurality of content costs do not have the same value.

15. The method of any one of clauses 10-14, further comprising:
   receiving, by the cache controller circuit, a data value to be cached;
   determining, by the cache controller circuit, a content cost for the data value; and
   determining, by the cache controller circuit, that the content cost of the data value is not lower than all of the plurality of content costs; and
   wherein identifying the cached data value of the plurality of cached data values associated with the lowest content cost as the target cached data value is responsive to determining that the content cost of the data value is not lower than all of the plurality of content costs.

16. The method of any one of clauses 10-15, wherein:
   receiving, by the cache controller circuit from a client device, a data value to be cached;
   receive, by the cache controller circuit from the client device, a caching hint based on a plurality of bit values of the data value; and
   determining, by the cache controller circuit based on the caching hint, to cache the data value;
   wherein identifying the cached data value of the plurality of cached data values associated with the lowest content cost as the target cached data value is responsive to determining to cache the data value.

17. A non-transitory computer-readable medium, having stored thereon computer-executable instructions that, when executed, cause a processor to:
   determine a plurality of content costs for each of a plurality of cached data values in a cache memory device, based on a plurality of bit values of each of the plurality of cached data values;
   based on the plurality of content costs, identify a cached data value of the plurality of cached data values associated with a lowest content cost as a target cached data value; and
   evict the target cached data value from the cache memory device.

18. The non-transitory computer-readable medium of clause 17, wherein the plurality of content costs each comprises a count of occurrences of a specified bit value among the plurality of bit values of a cached data value of the plurality of cached data values.

19. The non-transitory computer-readable medium of clause 17, wherein:
the computer-executable instructions further cause the processor to determine a most recently evicted data value; and
the plurality of content costs each comprises a count of changes in each bit value among a plurality of bit values of the most recently evicted data value compared with a corresponding bit value among the plurality of bit values of a cached data value of the plurality of cached data values.

20. The non-transitory computer-readable medium of any one of clauses 17-19, wherein the computer-executable instructions further cause the processor to:
determine whether all of the plurality of content costs have a same value; and
identify a cached data value of the plurality of cached data values as a target cached data value using an alternate cache replacement policy, responsive to determining that all of the plurality of content costs has the same value.

What is claimed is:

1. A processor-based device, comprising:
a cache memory device; and
a cache controller circuit of the cache memory device, the cache controller circuit configured to:
determine a plurality of content costs for each of a plurality of cached data values in the cache memory device, based on a plurality of bit values of each of the plurality of cached data values;
based on the plurality of content costs, identify a cached data value of the plurality of cached data values associated with a lowest content cost as a target cached data value; and
evict the target cached data value from the cache memory device;
wherein the plurality of content costs each comprises a count of occurrences of a specified bit value among the plurality of bit values of a cached data value of the plurality of cached data values.

2. The processor-based device of claim 1, wherein:
the cache memory device comprises a plurality of sets, each comprising a plurality of ways; and
the cache controller circuit is further configured to:
identify a set of the cache memory device in which a data value is to be cached; and
identify the plurality of cached data values stored in a corresponding plurality of ways of the set.

3. The processor-based device of claim 1, wherein:
the cache controller circuit is further configured to:
determine whether all of the plurality of content costs have a same value; and
identify the cached data value of the plurality of cached data values as the target cached data value using an alternate cache replacement policy, responsive to determining that all of the plurality of content costs have the same value; and
the cache controller circuit is configured to identify the cached data value of the plurality of cached data values associated with the lowest content cost as the target cached data value responsive to determining that all of the plurality of content costs do not have the same value.

4. The processor-based device of claim 1, wherein:
the cache controller circuit is further configured to:
receive a data value to be cached;
determine a content cost for the data value;
determine whether the content cost of the data value is lower than all of the plurality of content costs; and
responsive to determining that the content cost of the data value is lower than all of the plurality of content costs, bypass caching of the data value; and
the cache controller circuit is configured to identify the cached data value of the plurality of cached data values associated with the lowest content cost as the target cached data value responsive to determining that the content cost of the data value is not lower than all of the plurality of content costs.

5. The processor-based device of claim 1, wherein:
the cache controller circuit is further configured to:
receive a data value to be cached;
receive a caching hint based on a plurality of bit values of the data value;
determining, based on the caching hint, whether to cache the data value; and
responsive to determining not to cache the data value, bypassing caching of the data value; and
the cache controller circuit is configured to identify the cached data value of the plurality of cached data values associated with the lowest content cost as the target cached data value responsive to determining to cache the data value.

6. The processor-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

7. A processor-based device, comprising:
means for determining a plurality of content costs for each of a plurality of cached data values in a cache memory device, based on a plurality of bit values of each of the plurality of cached data values;
means for identifying, based on the plurality of content costs, a cached data value of the plurality of cached data values associated with a lowest content cost as a target cached data value; and
means for evicting the target cached data value from the cache memory device;
wherein the plurality of content costs each comprises a count of occurrences of a specified bit value among the plurality of bit values of a cached data value of the plurality of cached data values.

8. A method for providing content-aware cache replacement and insertion policies, the method comprising:
determining, by a cache controller circuit, a plurality of content costs for each of a plurality of cached data values in a cache memory device, based on a plurality of bit values of each of the plurality of cached data values;
identifying, by the cache controller circuit based on the plurality of content costs, a cached data value of the plurality of cached data values associated with a lowest content cost as a target cached data value; and evicting, by the cache controller circuit, the target cached data value from the cache memory device;

wherein the plurality of content costs each comprises a count of occurrences of a specified bit value among the plurality of bit values of a cached data value of the plurality of cached data values.

9. The method of claim 8, further comprising:

identifying, by the cache controller circuit, a set of a plurality of sets of the cache memory device in which a data value is to be cached; and identifying, by the cache controller circuit, the plurality of cached data values stored in a corresponding plurality of ways of the set.

10. The method of claim 8, further comprising determining, by the cache controller circuit, that all of the plurality of content costs do not have a same value;

wherein identifying the cached data value of the plurality of cached data values associated with the lowest content cost as the target cached data value is responsive to determining that all of the plurality of content costs do not have the same value.

11. The method of claim 10, further comprising:

receiving, by the cache controller circuit, a data value to be cached;

determining, by the cache controller circuit, a content cost for the data value; and determining, by the cache controller circuit, that the content cost of the data value is not lower than all of the plurality of content costs; and wherein identifying the cached data value of the plurality of cached data values associated with the lowest content cost as the target cached data value is responsive to determining that the content cost of the data value is not lower than all of the plurality of content costs.

12. The method of claim 8, further comprising:

receiving, by the cache controller circuit from a client device, a data value to be cached;

receiving, by the cache controller circuit from the client device, a caching hint based on a plurality of bit values of the data value; and determining, by the cache controller circuit based on the caching hint, to cache the data value;

wherein identifying the cached data value of the plurality of cached data values associated with the lowest content cost as the target cached data value is responsive to determining to cache the data value.

13. A non-transitory computer-readable medium, having stored thereon computer-executable instructions that, when executed, cause a processor to:

determine a plurality of content costs for each of a plurality of cached data values in a cache memory device, based on a plurality of bit values of each of the plurality of cached data values;

based on the plurality of content costs, identify a cached data value of the plurality of cached data values associated with a lowest content cost as a target cached data value; and evict the target cached data value from the cache memory device;

wherein the plurality of content costs each comprises a count of occurrences of a specified bit value among the plurality of bit values of a cached data value of the plurality of cached data values.

14. The non-transitory computer-readable medium of claim 13, wherein the computer-executable instructions further cause the processor to:

determine whether all of the plurality of content costs have a same value; and identify the cached data value of the plurality of cached data values as the target cached data value using an alternate cache replacement policy, responsive to determining that all of the plurality of content costs have the same value.

\* \* \* \* \*